UNITED STATES PATENT OFFICE 1,933,993

WATER SOLUBLE DERIVATIVES OF INDIGOID DYESTUFFS

Walter Mieg, Opladen, and Rudolf M. Heidenreich, Leverkusen-on-the-Rhine, Germany, assignors to General Aniline Works, Inc., New York, N. Y., a corporation of Delaware No Drawing. Application July 20, 1929, Serial No. 379,879, and in Germany July 31, 1928

6 Claims. (Cl. 260—48)

The present invention relates to a process of preparing water soluble derivatives of indigoid dyestuffs and to the new products obtainable thereby.

In accordance with the invention such indigoid dyestuffs as contain at least one N-unsubstituted indole ring system are caused to react with a benzoic acid-sulfo halide, such as meta- or para-benzoic acid sulfo-chloride, meta- or para-benzoic acid sulfobromide or the like, in the presence of a cyclic tertiary organic base, such as pyridine or its homologues, and at a temperature between about 80° C. and the boiling point of the reaction mixture. The reaction will be finished as soon as a test portion is completely soluble in hot water, which will generally be the case within about 1-2 hours.

As indigoid dyestuffs suitable for performing the reaction the following may be mentioned by way of example: Indigo, monohalogenindigos, such as 5-bromoindigo, alkylindigos, such as 7.7' dimethylindigo, 5.7 dibromoindole-4-bromonaphthalene indigo, indirubine and the like.

The products thus obtainable which probably correspond to the general formula

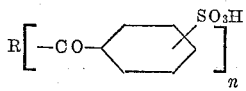

wherein R represents the residue of the indigoid dyestuff molecule, $n$ stands for one of the numbers 1 or 2 and wherein the —CO— group is attached to the nitrogen atom of the indole ring system of R, form dark powders soluble in water with bluish red to blue colorations, difficultly soluble or insoluble in the usual organic solvents, being reconverted into the starting dyestuffs by the action of saponifying agents, preferably by alkalies. Thus, for example, by the action of benzoic acid-meta-sulfo chloride

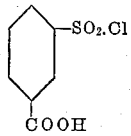

on indigo in the presence of a cyclic tertiary organic base, such as pyridine, there is obtained a compound readily soluble in water, which is readily reconverted into indigo even in the cold by means of alkalies. On more energetic treatment, for example, on prolonged boiling of the solution, differently colored products, no longer reconvertible into indigo, are obtained.

The ready solubility in water of the compound produced by the milder treatment as described above indicates the probability, that in the reaction a rearrangement appears to have occurred with the formation of a carboxylic acid amide containing free sulphonic acid groups.

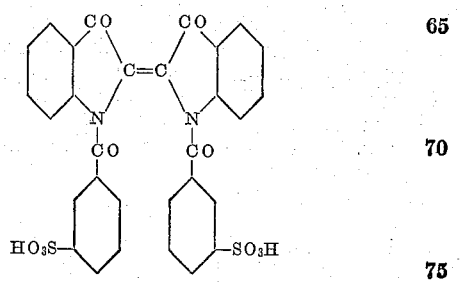

Our new compounds possess affinity to animal and vegetable fibers, and since they are capable of being easily reconverted into the original dyestuffs on the fibre they are of particular value in dyeing and printing.

The invention is illustrated by the following examples, but is not restricted thereto:—

Example 1

40 parts by weight of indigo and then 100 parts by weight of benzoic acid-meta-sulfo chloride are introduced into 200 parts by weight of dry pyridine and the mixture is heated to 100-110° C. until a test portion dissolves completely in water with a violet coloration, which will be the case after about two hours. The reaction mixture may be worked up by distilling off the pyridine in vacuo, dissolving the violet residue in water and salting out, for example, with ammonium sulfate. The reddish violet solution of the compound thus obtained in ice cold sulfuric acid soon becomes discolored owing to saponification and sulfonation. Caustic soda lye, even when very dilute and at the ordinary temperature, produces reconversion of the new compound into indigo. Saponification also occurs with weaker alkalies. Sodium carbonate, for example, causes saponification with the formation of an intermediate product, probably the monoacyl derivative, which is soluble in water with a blue coloration.

On replacing in this example the meta-benzoic acid sulfochloride by meta-benzoic acid sulfobromide the same compound is obtained.

Example 2

A mixture of 20 parts by weight of the dyestuff of the probable formula:

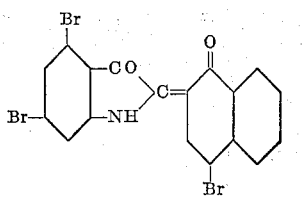

(5.7-dibromo indole -4-bromo naphthalene-indigo), 30 parts by weight of benzoic acid meta-sulfo chloride and 300 parts by weight of dry pyridine are heated quickly while stirring to 110° C. Yellowish brown prisms soon separate already from the hot solution and are filtered off after cooling. They dissolve in hot water with a blue coloration, in pyridine with a brown coloration, which is changed into deep blue on the addition of water. With dilute alkalies the starting material is easily reconverted into the starting material.

Example 3

A mixture of 20 parts by weight of 5-bromoindigo, 40 parts by weight of benzoic acid -meta-sulfochloride and 140 parts by weight of dry pyridine are heated to about 105-110° C. while stirring, until a test portion is completely soluble in water with a reddish blue coloration. The dyestuff thus formed is isolated by pouring the reaction mixture into water and salting out. When treated with hot dilute soda lye the new product is easily split up and reconverted into 5-bromoindigo.

Example 4

A mixture of 10 parts by weight of 7.7'-dimethylindigo, 20 parts by weight of benzoic acid -meta-sulfochloride and 50 parts by weight of pyridine are heated to about 100-105° C. until a sample is completely soluble in water. The reaction product is isolated by pouring the melt into ice water and salting out. The product thus obtainable is rather easily soluble in water with a violet red coloration. Caustic soda lye, even when very dilute and at ordinary temperature, produces saponification.

Example 5

5 parts by weight of indigo are heated to boiling with 30 parts by weight of pyridine and 10 parts by weight of benzoic acid-para-sulfochloride until a sample is completely soluble in water. After that the melt is dissolved in water, hydrochloric acid is added in order to bind the pyridine and the dyestuff is salted out with ammonium sulfate. The product thus obtainable is very similar in its properties to that of Example 1. It dissolves in water with a violet coloration and is easily decomposed by alkalies.

We claim:—

1. The process which comprises reacting upon an indigoid dyestuff containing at least one N-unsubstituted indole ring system, with a compound of the formula:

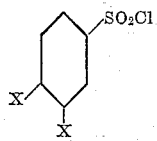

wherein one X means hydrogen and the other X stands for the carboxylic acid group in the presence of pyridine under substantially anhydrous conditions at a temperature between about 80° C. and the boiling point of the reaction mixture, until a test portion is completely soluble in water.

2. The process which comprises reacting upon indigo which may be substituted in the benzene nuclei by methyl groups, with benzoic acid-m-sulfochloride in the presence of pyridine under substantially anhydrous conditions at a temperature between about 80° C. and the boiling point of the reaction mixture, until a test portion is completely soluble in water.

3. The process which comprises reacting upon 40 parts by weight of indigo in 200 parts by weight of anhydrous pyridine, with 100 parts by weight of benzoic acid-m-sulfo-chloride at a temperature of about 100-110° C., until a test portion is completely soluble in water.

4. As new products the compounds of the probable general formula

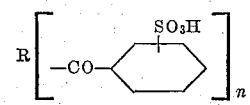

wherein R represents the residue of an indigoid dyestuff molecule, $n$ stands for one of the numbers 1 or 2 and wherein the —CO— is attached to the nitrogen atom of an indole ring system of R, said products forming dark powders soluble in water with bluish red to blue colorations, being reconverted into the starting indigoid dyestuffs by saponifying agents.

5. As new products the compounds of the probable general formula

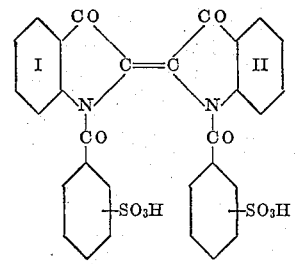

wherein the nuclei I and II may be substituted by methyl groups, said products forming dark powders soluble in water with bluish red to blue colorations, being reconverted to the starting dyestuffs by saponifying agents.

6. As a new product, the compound of the probable formula

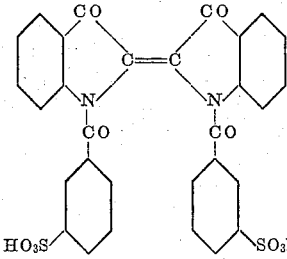

said product forming a dark violet powder soluble in water with a violet coloration, being split up to indigo by saponifying agents.

RUDOLF M. HEIDENREICH. [L. S.]
WALTER MIEG. [L. S.]